United States Patent [19]
Hirono

[11] Patent Number: 5,579,041
[45] Date of Patent: Nov. 26, 1996

[54] PRINTING DEVICE BORDERING FUNCTION AND A METHOD THEREOF

[75] Inventor: Kazuhisa Hirono, Nagoya, Japan

[73] Assignee: Brother Kogyo Kabushiki Kaisha, Nagoya, Japan

[21] Appl. No.: 272,575

[22] Filed: Jul. 11, 1994

[30] Foreign Application Priority Data

Aug. 18, 1993 [JP] Japan .................................. 5-226524

[51] Int. Cl.⁶ .................................. B41J 5/30; B41J 2/32; G06K 15/00
[52] U.S. Cl. .................................................. 347/171
[58] Field of Search .......................... 400/1, 3, 61, 62, 400/63, 65, 83, 120.01; 347/171

[56] References Cited

FOREIGN PATENT DOCUMENTS

| 0552562A1 | 7/1993 | European Pat. Off. . |
| 0551995A1 | 7/1993 | European Pat. Off. . |

Primary Examiner—Huan H. Tran
Attorney, Agent, or Firm—Oliff & Berridge

[57] ABSTRACT

A print device capable of printing a border, having a complicated shape, around characters input at a keyboard or other input device. Border data representing many varieties of border lines are stored in a border storage memory. Document data corresponding to the input characters are positioned with respect to the border data in a print buffer. Different types of border lines may be selected and combined to form a desired border around the input characters.

17 Claims, 12 Drawing Sheets

Fig.3B

| ITEM | INSTRUCTIONS |
|------|--------------|
| S1 | KEY MANIPULATED ? |
| S2 | CHARACTER KEY ? |
| S3 | TMF=1 ? |
| S4 | STORE CHARACTER CODE INTO TEXT MEMORY |
| S5 | PRINT KEY ? |
| S6 | TMF=1 ? |
| S7 | TEXT EMPTY ? |
| S8 | PRINT PROCESSING |
| S9 | CURSOR KEY ? |
| S10 | CURSOR KEY PROCESSING |
| S11 | SELECTION KEY ? |
| S12 | SELECTION KEY PROCESSING |
| S13 | FORMAT SET KEY ? |
| S14 | FORMAT SET KEY PROCESSING |
| S15 | OTHER PROCESSING |

Fig.7B

| ITEM | INSTRUCTIONS |
|---|---|
| S50 | TRP← TADRS, FORMAT← 0 |
| S51 | SET REFERENCE POSITION COORDINATES PX, PY TO ORIGIN POSITION COORDINATES PX0, PY0 |
| S52 | PROCESSING OF ALL CHARACTERS COMPLETED ? |
| S53 | READ IN CODE FROM TRP |
| S54 | FORMAT CODE ? |
| S55 | CONTROL CODE ? |
| S56 | JUDGE CHARACTER SIZE, INTER-CHARACTER SETTING AND SET SX, KX |
| S57 | FORMAT← 0 |
| S58 | TRP← TRP+1 |
| S59 | FORMAT=3 ? |
| S60 | LOCATE LAST FIXED FORM PORTION, SET REFERENCE POSITION COORDINATE PX PX← PX+TX4 |
| S61 | PRINT CONTENTS OF PRINT BUFFER |
| S62 | FORMAT=0 ? |
| S63 | FORMAT=1 ? |
| S64 | FORMAT=2 ? |
| S65 | PY← PY3, ORDATA← OR3 |
| S66 | DETERMINE SUM OF CHARACTER DOT DATA AND ORDATA, SET REFERENCE POSITION COORDINATE PX PX← PX+SX+KX |
| S70 | PY← PY0, ORDATA← 0 |
| S71 | PY← PY1, ORDATA← OR1 |
| S72 | PY← PY2, ORDATA← OR2 |

FIXED FORM PORTION    FIXED FORM PORTION

PRINTING DEVICE BORDERING FUNCTION AND A METHOD THEREOF

BACKGROUND OF THE INVENTION

1. Field of the invention

This invention relates to a print device for tape writers, word processors, and similar devices.

2. Description of the Related Art

Conventionally, some print devices for tape writers, word processors, etc. have a bordering function. An input character array is encompassed with a border, the border including a simple line such as a straight line or a wavy line. Further, the border may include four rounded corners.

However, no device is capable of printing a border having a complicated shape, such as a combination of a straight line, an oblique line, a curved line, etc. Thus, a device having the ability to print a more complicated border shape is desirable, to increase print variation.

SUMMARY OF THE INVENTION

In view of these limitations of the prior art, an object of the invention is to provide a print device in which a border having a complicated shape can be printed to achieve abundant print variation. Border data representing various border lines is stored, and document data is combined with the stored border data to create such print variation.

In order to attain the above and other objects, according to embodiments of the invention, a print device includes input means for inputting letters, symbols and various instructions, input data storing means for storing document data input by the input means, display means for displaying a document represented by the document data stored in the input data storing means, various kinds of messages for various kinds of choices, etc., and printing means for printing the document represented by the document data stored in the input data storing means. The print device includes border storage means for storing border data representing a border line divided into at least two blocks, designating means for designating a block of the border line represented by the border data for locating characters within the block, border data transforming means for transforming the border data in accordance with the document data, locating means for locating the document data within the border line represented by the border data transformed by said border data transforming means, and print control means for printing both the document represented by the document data located by the locating means and the border line represented by the border data.

According to embodiments of the invention, border data representing a border line divided into at least two blocks is stored in the border data storage means, and a block of the border line represented by the border data is designated by the designating means. The border data is transformed in accordance with the document data by the border data transforming means, and the document data is located within the border line represented by the transformed border data by the locating means. The document represented by the document data located by the locating means and the border line represented by the border data are printed by the print control means.

BRIEF DESCRIPTION OF THE DRAWINGS

Preferred embodiments of the invention will be described in detail with reference to the figures, wherein:

FIGS. 3A–3B are a flow chart for an operation carried out by a control device of the FIG. 2 control system;

FIGS. 7A–7B are a flow chart for print processing in the operation of FIGS. 3A–3B;

DETAILED DESCRIPTION OF PREFERRED EMBODIMENTS

Figure 1:
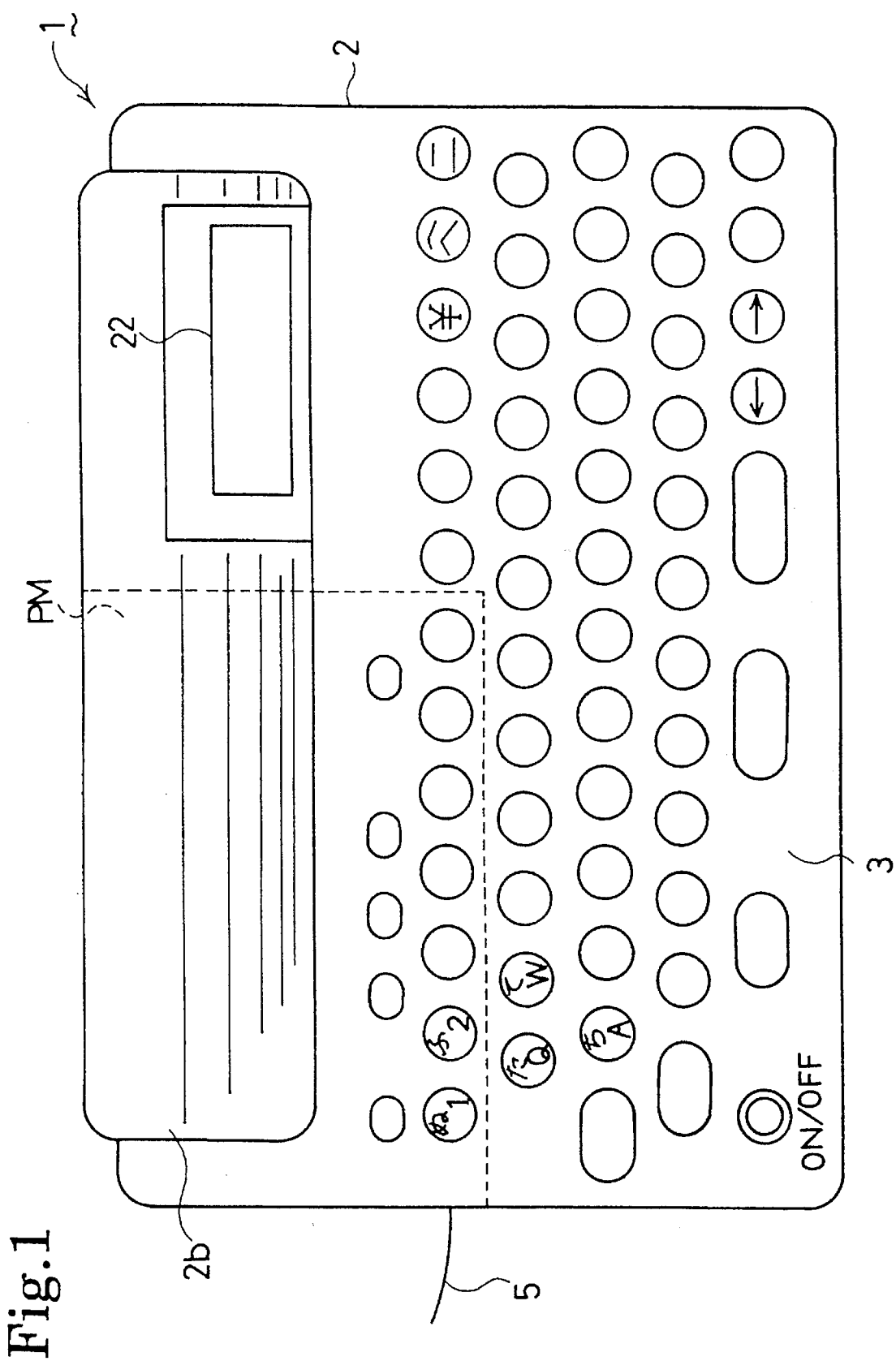
FIG. 1 is a plan view of a tape print device according to an embodiment of the invention.

A preferred embodiment of the invention is applied to a tape print device for the Japanese language, in which various characters such as Kanji, Hiragana, alphabet characters and other letters, symbols, etc. can be printed on a print tape. FIG. 1 is a plan view of a tape print device according to this embodiment. A keyboard 3 is disposed in front of a main body frame 2 of the tape print device 1, and a print mechanism PM is disposed in the main body frame behind the keyboard 3. Further, a compact liquid crystal display (LCD) 22 capable of displaying several letters and symbols is provided on a bent frame portion 2b at the rear side of the keyboard 3.

The keyboard 3 is provided with character keys for inputting alphabet characters, Hiragana, numerals, symbols, etc., a space key, cursor keys for scrolling a character array displayed on display 22 rightwardly or leftwardly, a non-conversion key, a conversion key, an input mode switching key for switching and setting a character input mode, a format set key for setting a print format, a print key for conducting a print operation, a tape feed key for feeding a print tape 5, a power source key for conducting an ON/OFF operation on a power source, and other keys as desired.

The print mechanism PM includes a thermal head 13 (see FIG. 2) having a predetermined number of heating elements arranged upwardly and downwardly, and the thermal head 13 is supplied with a print tape 5 of transparent film having a predetermined width (for example, 12 mm) and an ink ribbon. By supplying current into the heating elements of the thermal head 13, letters or symbols of plural dot array are printed on the print tape 5. Thereafter, the printed print tape 5 is attached to a duplex tape, that is, a double-sided adhesive tape that receives print tape 5 on one surface and can be secured to a desired object at the other surface. The print tape, secured to the duplex tape, then is discharged from the main body frame 2 to the outside. The print tape 5, the ink ribbon and the duplex tape preferably are integrally built in a rectangular tape stock cassette.

Figure 2:
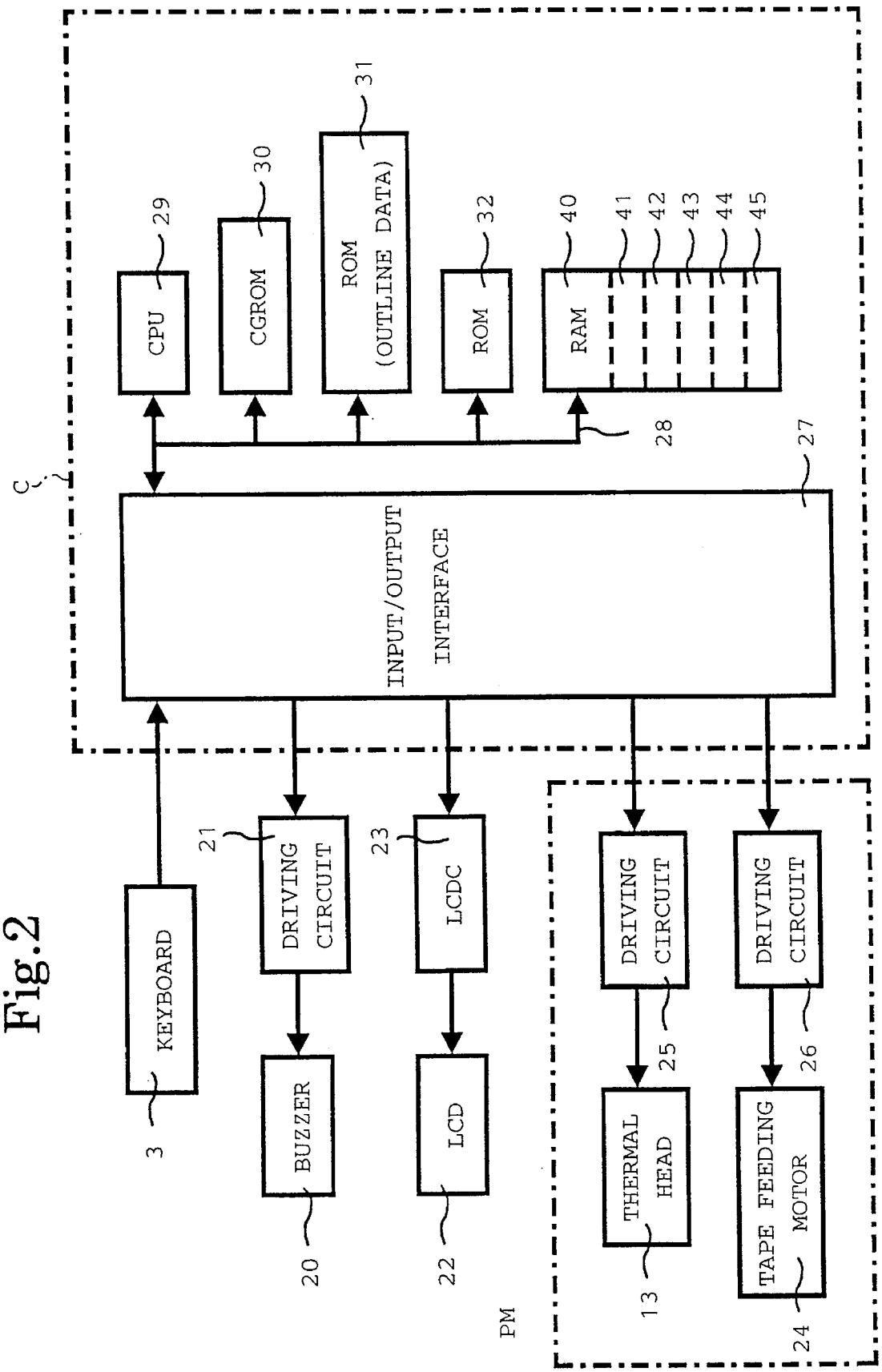
FIG. 2 is a block diagram of a control system for a tape print device according to an embodiment of the invention.

Next, a preferred control system for a tape print device 1 will be described with reference to the block diagram of FIG. 2. A control device C includes a CPU 29, an input/output interface 27, a CGROM 30, ROMs 31 and 32 and a RAM 40. These elements are connected to one another through a bus 28. The control device C is connected through the input/output interface 27 to keyboard 3, a display controller (LCDC) 23 having a display RAM for outputting display data to the liquid crystal display (LCD) 22, a driving circuit 25 for driving thermal head 13, a driving circuit 26 for driving a tape feeding motor 24 for rotationally driving plural spools around which a print tape 5, an ink ribbon and a duplex tape are wound and various kinds of rollers, and a driving circuit 21 for a warning buzzer 20.

The CGROM (pattern data memory) 30 stores dot pattern display data for many characters, in correspondence with code data. For each character, the ROM (outline data memory) 31 stores outline data defining the outline of each character, in correspondence with code data. The outline data are classified according to different fonts (Gothic type, Ming type, etc.).

The RAM 40 has various areas for a text memory 41, a print format memory 42, a print buffer 43, a flag memory 44 and a format print control memory 45. At least the text memory 41, the print format memory 42, the flag memory 44 and the format print control memory 45 are always backed up to prevent their stored contents from being purely volatile. The text memory 41 stores code data of letters and symbols input from the keyboard 3 in the form of document data. The print format memory 42 stores plural print format information such as set character size data, font data, print direction (longitudinal print direction or lateral print direction), etc. The print buffer 43 stores dot pattern data of plural letters and symbols to be printed.

The flag memory 44 stores several kinds of flag data such as mode flag data, for example. Mode flag data can include a text input mode flag TMF, which is set ("1") in the text input mode, and a format set mode flag FMF, which is set in the format set mode. Only one of these two kinds of mode flags is set at any one time; thus, two or more flags are not set simultaneously.

The format print control memory 45 includes several kinds of memories, such as a format memory for storing a variable F representing a designated format pattern (shown, for example, in FIGS. 9B–9E), a text read pointer memory for storing a reading position of data TRP (text read pointer) from the text memory 41, a reference position memory for storing reference position coordinates PX and PY where dot pattern data is located in a print buffer 43, a logical sum memory ORDATA for storing dot data of a format pattern, a format pattern size memory TX for storing format pattern size in an X-direction, a size memory for storing the dot number SX of characters in an X-direction, an inter-character memory for storing the dot number KX between characters, and a format data preparation stage memory FORMAT for storing a designated number of blocks of format data for printing.

The ROM 32 stores a display driving control program for controlling display controller 23 in correspondence with the code data of characters, such as the letters, numerals, symbols, etc. input from the keyboard 3, an image-development processing control program for converting the outline data corresponding to each code in the text memory 41 to print dot pattern data and transferring it into the print buffer 43 of the RAM 40, a print driving control program for successively reading data out of the print buffer 43 and driving the thermal head 13 and the tape feeding motor 24, a tape print device control program described later, and a control program for format setting, which is a feature of this embodiment. The ROM 32 also stores format print data. Various kinds of format print data are obtained by reading data out of a format management table corresponding to a format number. This format data includes the block number of the format, dot data of fixed form portion of each block, line number data for each block, line type data and line position data.

Figure 3A:
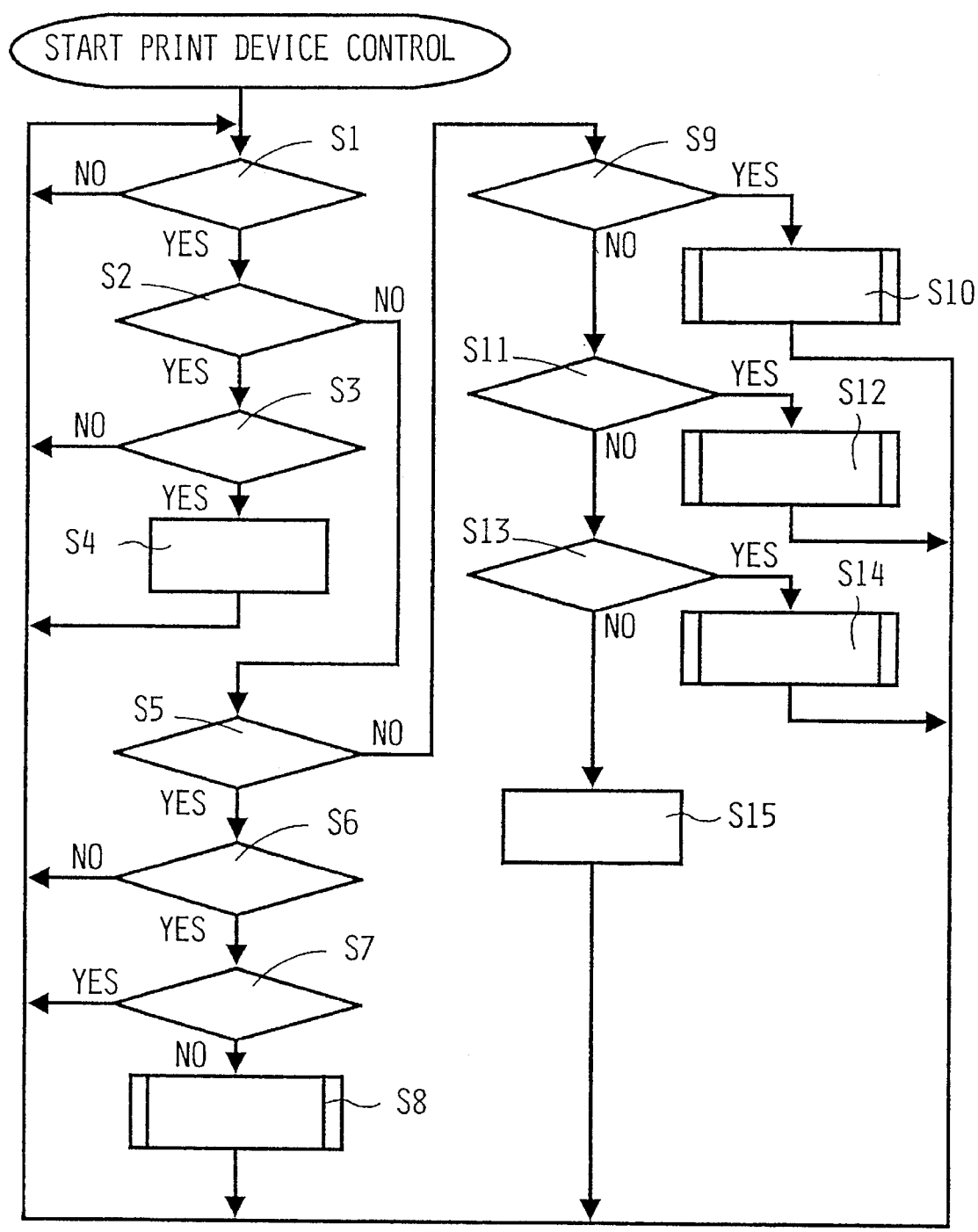

Next, the operation that is carried out by the control device C of the tape print device 1 will be described with reference to FIGS. 3A–3B. When a power source is first switched on by manipulating a power source key, various initializations are made, and then the control of the tape print device is started, so that the text content is displayed. During the initialization process, the text input mode flag TMF is set, and the format setting mode flag FMF is reset. ("Set" represents a flag value "1", and "reset" represents a flag value "0".) In a second or subsequent switch-on operation of the power source, this initialization is not conducted. The set values at power-off are kept, without being lost, because the values of these flags are backed up, that is, stored in permanent memory.

First, it is determined whether a key manipulation is carried out (S1). If a key manipulation is determined not to have been conducted, S1 is repeated until a key manipulation is determined to have been conducted. At S1, if a key manipulation is conducted and the key is a character key (Yes at S2), it is determined on the basis of the flag value of the text input mode flag TMF whether the device is in a text input mode (S3). If it is in the text input mode, that is, if the text input mode flag TMF is set, the code data of the character input by the character key is stored in the text memory 41 (S4), and then the program returns to S1. If it is determined at S3 that the device is not in the text input mode, that is, if the text input mode flag TMF is reset, the program directly returns to S1.

If at S2 the input key is determined not to be a character key but a "print key" (NO at S2, YES at S5), it is determined whether the device is in the text input mode (S6), as at S3. If it is in the text input mode, it is determined whether the text memory 41 is empty (S7). If at S7 the text memory 41 is empty, the program directly returns to S1. If not, print processing is conducted (S8), and then the program returns to S1. If at S6 it is determined that the device is not in the text input mode, the program directly returns to S1.

If the input key is neither a character key nor a print key, but instead is a cursor key (NO at S2, NO at S5, YES at S9), cursor key processing is conducted (S10), and then the program returns to S1. If the input key is not a character key, print key or cursor key, but instead is a selection key (NO at S2, NO at S5, NO at S9, YES at S11), selection key processing is conducted (S12), and then the program returns to S1. If the input key is not a character key, print key, cursor key or selection key, but instead is a format set key (NO at S2, NO at S5, NO at S9, NO at S11, YES at S13), format set key processing is conducted (S14), and then the program returns to S1. If the input key is not a character key, print key, cursor key, selection key or format set key (NO at S2, NO at S5, NO at S9, NO at S11, NO at S13), other processing is conducted (S15), and then the program returns to S1. The other processing may be, for example, conversion processing after a conversion key input, or character input mode switching processing after an input mode switching key input.

Figure 4:
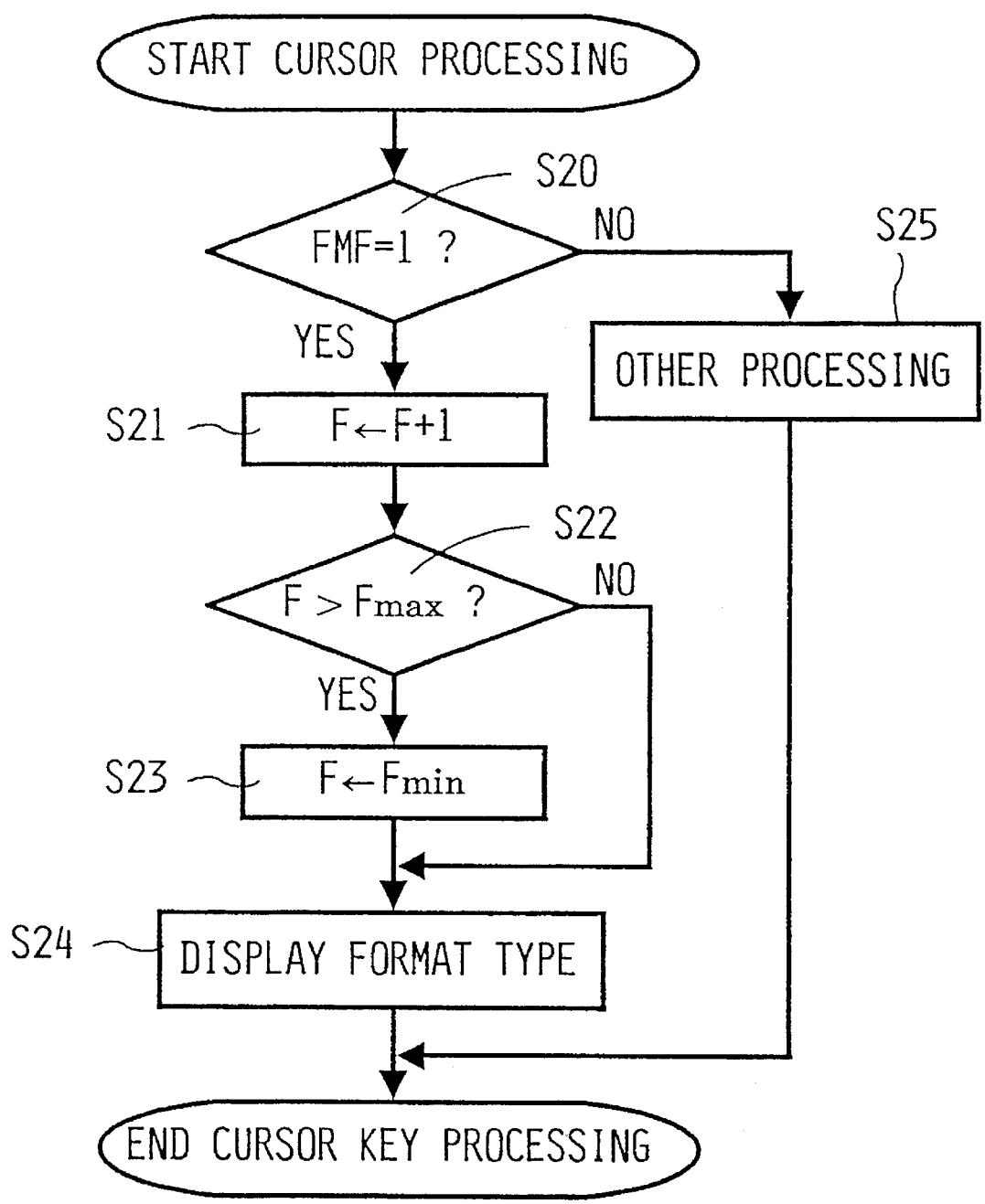
FIG. 4 is a flow chart for cursor key processing in the operation of FIGS. 3A–3B.

Next, cursor key processing will be described with reference to FIG. 4. First, on the basis of the flag value of the format set mode flag FMF, it is determined whether the device is in the format set mode (S20). If the device is in the format set mode, that is, if the format set mode flag FMF is set, the variable F representing the type of format is incremented by 1 (S21). Subsequently, it is determined whether the variable F exceeds its maximum value Fmax (S22). If the variable F exceeds its maximum value Fmax, the variable F is set to its minimum value Fmin (S23), and the value of the variable F representing the format type is displayed (S24), and cursor key processing then ends. If it does not exceed the maximum value Fmax at S22, the program goes directly to S24. Through processing steps S20 to S24, the variable F representing the format type is switched in a range from the minimum value Fmin to the maximum value Fmax. The values of the variable F, the minimum value Fmin and the maximum value Fmax are set at the time of initialization. The variable F is set to a value in the range from the minimum value Fmin to the maximum value Fmax. Further, if the device is not in the format set mode at S20, that is, if the format set mode flag FMF is reset, other processing is conducted (S25), and then cursor key processing ends.

Figure 5:
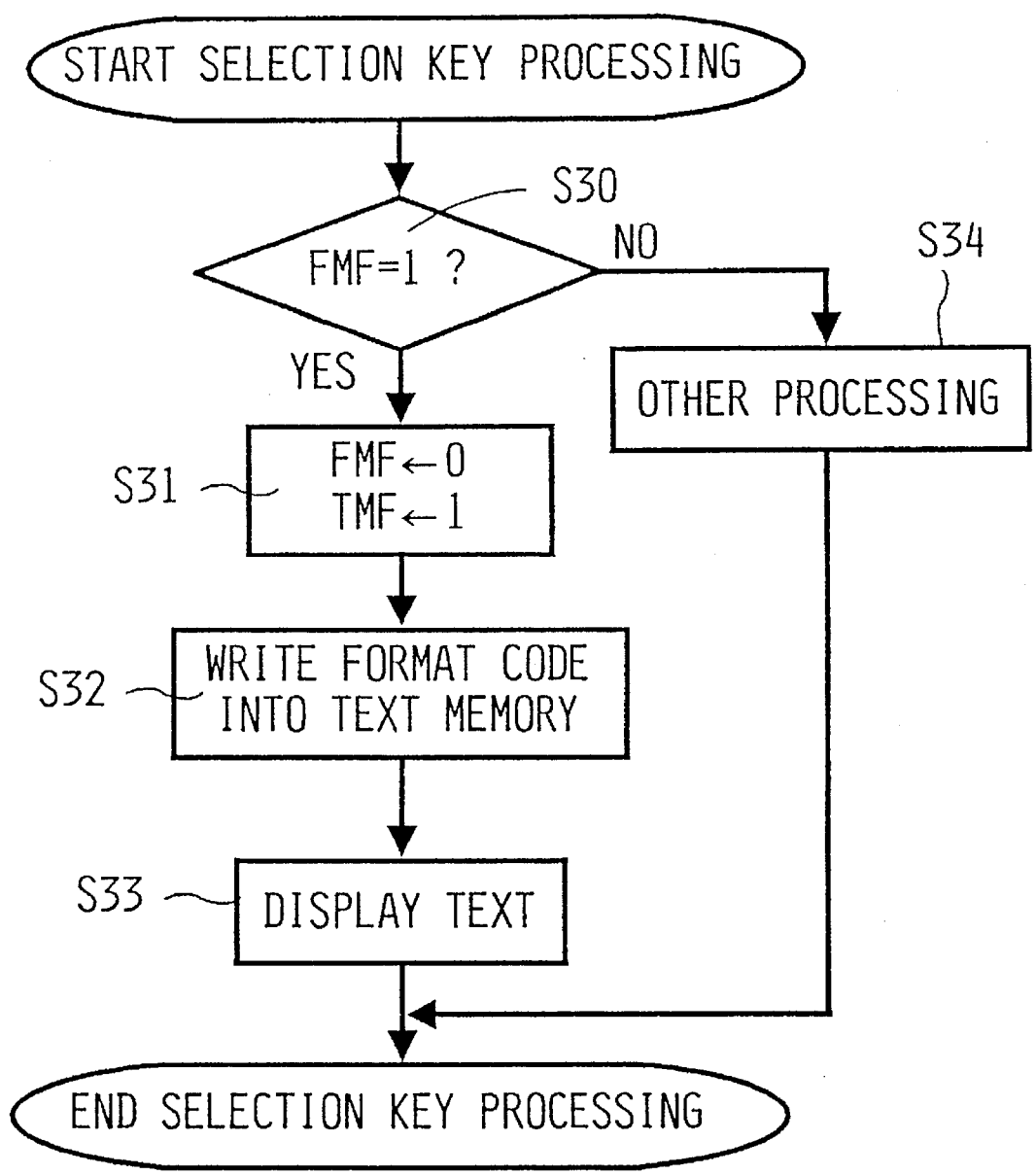
FIG. 5 is a flow chart for selection key processing in the operation of FIGS. 3A–3B.

Next, selection key processing will be described with reference to FIG. 5. First, as in S20, it is determined whether the device is in the format set mode (S30). If it is in the format set mode, the format set mode flag FMF is reset, and the text input mode flag TMF is set (S31). Subsequently, the format code is stored in the text memory 41 (S32), a text display operation is conducted (S33), and selection key processing then ends. Through processing steps S30 to S33, the mode of the device is shifted from the format set mode to the text input mode. If the device is not in the format set mode at S30, other processing is conducted (S34), and then selection key processing ends.

Figure 6:
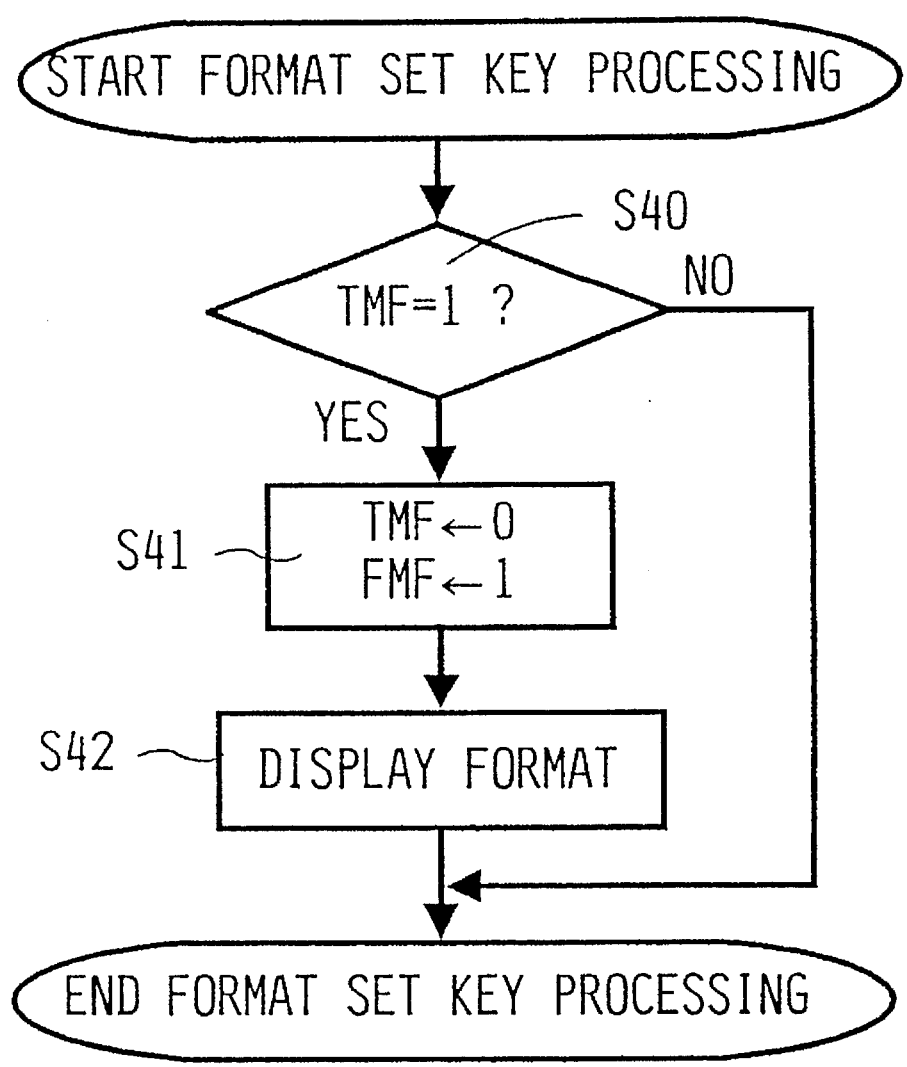
FIG. 6 is a flow chart for format set key processing in the operation of FIGS. 3A–3B.

Next, format set key processing will be described with reference to FIG. 6. First, as in S3, it is determined whether the device is in the text input mode (S40). If it is in the text input mode, the text input mode flag TMF is reset and the format set mode flag FMF is set (S41), the format is displayed (S42), and then format set key processing ends. If the device is not in the text input mode at S40, format set key processing ends directly. Through processing steps S40 to S42, the mode is shifted from the text input mode to the format set mode.

Next, a normal key manipulation procedure for preparing data for printing character arrays while surrounding these arrays with border lines will be described, with reference to FIGS. 3A to 6. In the text input mode, when the format set key is pushed, through the YES judgment at S40 of FIG. 6, the format set mode flag FMF is set at S41, and at S42 the format is displayed. When the cursor key is pushed in the above state, through the YES judgment at S20 of FIG. 4, the type of format is altered through processing steps S21, S22, S23 and S24, and by continuing to push the cursor key, a desired format type is set and displayed.

Subsequently, when the selection key is pushed, through the YES judgment at S30 of FIG. 5, at S31 the text input mode flag TMF is set. Then, at S32, the format code representing the type of the displayed format (the value of the variable F) is stored in the text memory 41, and then text display is conducted at S33. If the character keys "TO A", for example, are pushed in the above state, through the YES judgment at S2 and S3 of FIG. 3A the program goes to S4, so that the character codes "TO A" are stored in the text memory 4. Likewise, in subsequent steps, the format set key, the cursor key, the selection key and the character key are pushed and the same processing as described above is repeated, so that new format codes and new character codes are stored in the text memory 41. Thereafter, by pushing the print key, through the NO judgment at S2, the YES judgment at S5, the YES Judgement at S6 and the NO judgment at S7, the program goes to S8, at which the data thus prepared is subjected to print processing.

Next, print processing will be described with reference to FIGS. 7A–7B and 8. Data for formatted printing are read out from the format managing table in accordance with the beforehand-set format number(s). First, the head address TADRS of the text memory 41 is set in the text read pointer TRP, and the format data preparation stage memory FORMAT is reset (S50). Subsequently, reference position coordinates PX, PY are set to the origin position coordinates PX0, PY0 for the print buffer 43 (S51). It is determined whether all the characters stored in the text memory 41 are in the print buffer 43 (S52). If all the characters are not in the print buffer 43, a code is read in from an address set in the text read pointer TRP (S53), and it is determined whether the code is a format code (S54). At S54, if the code is not a format code, it is determined whether the code is a control code (S55). If it is a control code, a character size and a dot number in the X-direction between characters are obtained from the control code, and these data are set in the respective storage locations SX, KX of the size memory and the inter-character memory (S56). Subsequently, "0" is set in the format data preparation stage memory FORMAT (S57), and the text read pointer TRP is incremented by 1 (S58). The program then returns to S52.

Figure 8:
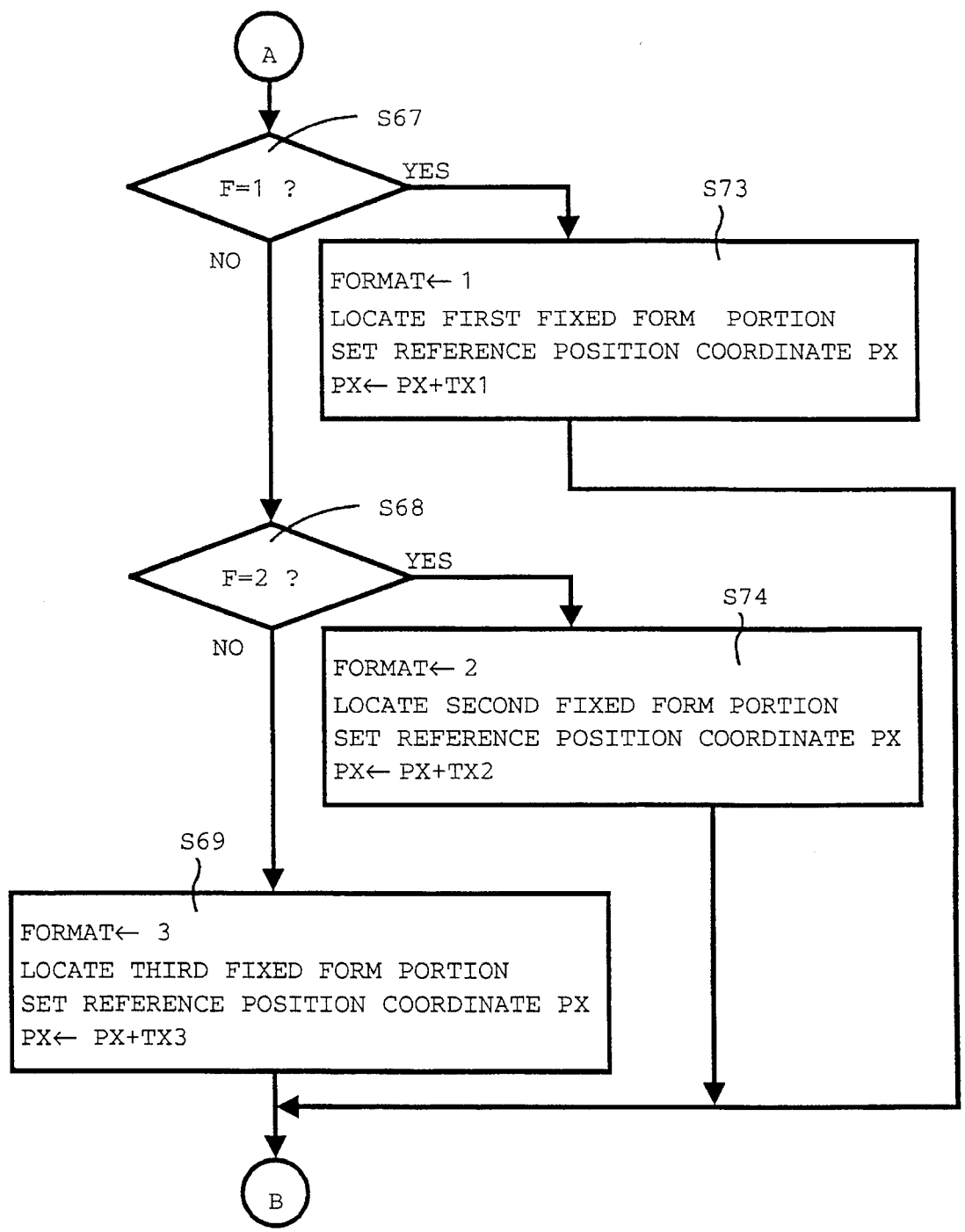
FIG. 8 is a continuation of the flow chart of FIGS. 7A–7B.

If the code is determined to be a format code at S54, the program goes to a location processing operation for determining the location of the fixed form portion dot data in the print buffer 43, at S67 to S69 and S73 to S74 (FIG. 8). First, it is determined whether the variable F representing the type of format is equal to "1" (S67). If the variable F is equal to "1", "1" is set in the format data preparation stage memory FORMAT (S73), and the first fixed form portion is located by setting the reference position coordinate PX of the print buffer 43. The coordinate PX is incremented by TX1, which is a size of a first fixed form portion, such as the fixed form portion F(1) of FIG. 9B, and the program goes to S58. If the variable F1 is not equal to "1" at S67, it is determined whether the variable F is equal to "2" (S68). If the variable F is equal to "2", "2" is set into the format data preparation stage memory FORMAT (S74), and the second fixed form portion is located by setting reference position coordinate PX of the print buffer 43. The coordinate PX is incremented by TX2, which is a size of a second fixed form portion, such as fixed form portion F(2) illustrated in FIG. 9C, and the program goes to S58. If the variable F is not equal to "2" at S68, the variable F is judged to be "3" (S69), so that "3" is set into the format data preparation stage memory FORMAT, and the third fixed form portion is located by setting the coordinate PX of the print buffer 43 as the reference position. The coordinate PX is incremented by TX3, which is a size of a third fixed form portion, such as the fixed form portion F(3) illustrated in FIG. 9D, and then the program goes to S58.

At S55, if the code read in from the TRP is not a control code, it is a character code. Therefore, the program goes to a location processing operation for determining the location of character dot data in the print buffer 43, at S62 and subsequent steps. First, the value of the format data preparation stage memory FORMAT is checked, to set the coordinate PY and the logical sum memory ORDATA in accordance with the value of the format data preparation stage memory FORMAT (S62 to S65, S70 to S72). Subsequently, the logical sum of the character dot data and the logical memory ORDATA is used to set the reference position coordinate PX of the print buffer 43 (S66). The coordinate PX is added to the dot numbers SX and KX, which are stored in the size memory and the inter-character memory, respectively. The border line thus is expanded in accordance with the number of input characters, by transforming the border line data then set in the buffer. The program thereafter goes to S58.

When all the characters stored in the text memory 41 are located in the print buffer 43 through repetitive operation of the above processing, it is determined whether the format data preparation stage memory FORMAT is equal to "3" (S59). If the format data preparation stage memory FORMAT is equal to "3", the last fixed form portion is located by setting the reference position coordinate PX of the print buffer 43. The coordinate PX is incremented by TX4 (S60), which is a size of a fourth fixed form portion, such as the fixed form portion F(4) illustrated in FIG. 9E. Subsequently, the contents of the print buffer 43 are printed (S61), and then print processing ends. If the format data preparation stage memory FORMAT is not equal to "3" at S59, the program directly goes to S61.

FIGS. 9A–9E and 10 show a print result when the formatted printing of this embodiment is conducted on the basis of format print data including multiple format numbers. As one example, the case for the print result of FIGS. 9A–9E will be described. In this case, through key manipulation as described above, prior to entering the characters for the character codes "TO A", "1" is set as a format code in the variable F, to represent the type of format. Likewise, the variable F is set to "2", "3" and "4", prior to entering the characters for the character codes "MERRY X'mas" and "FROM B" and after the characters for the character codes "FROM B", respectively.

Figure 7A:
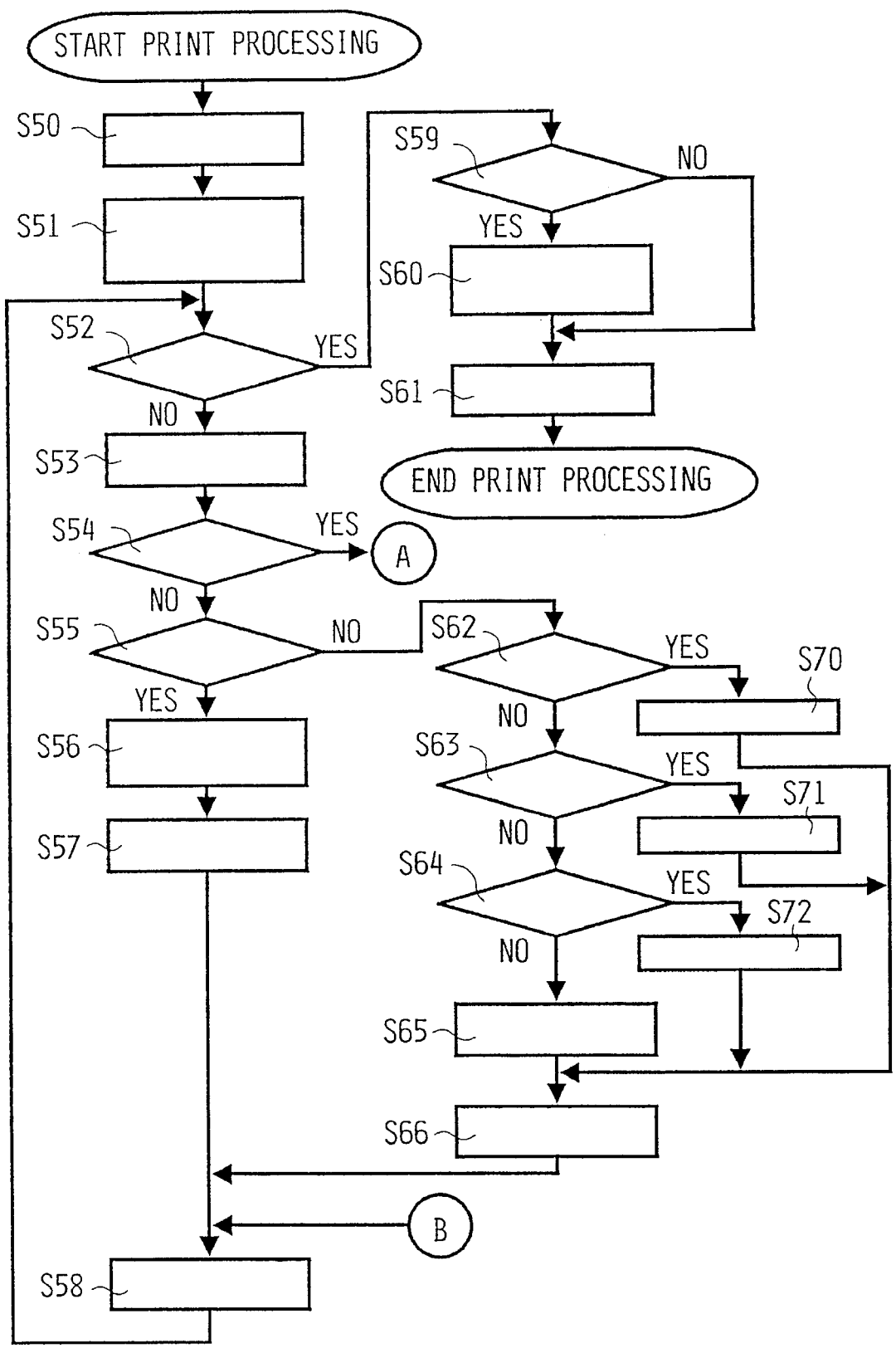

In the print processing routine as shown in FIGS. 7A–7B, the determination at S52 continues to be NO until processing of all the characters is completed. First, at S53 the format code is read in from the text read pointer TRP, and through the YES judgment at S54, the program goes to S67 of FIG. 8. Here, when the variable F=1, the determination at S67 becomes YES, and the program goes to S73. At this step, the processing of the first fixed form portion is conducted, and then the program returns to S52 after processing step S58.

Figure 9A:
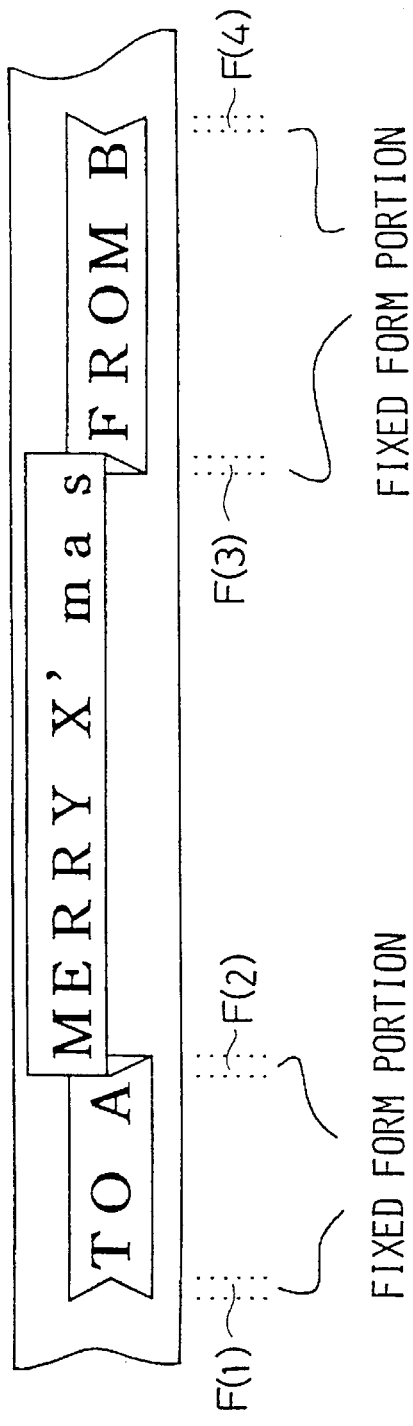
FIG. 9A shows a print result of a formatted print operation.
Figures 9B, 9C, 9D, 9E:
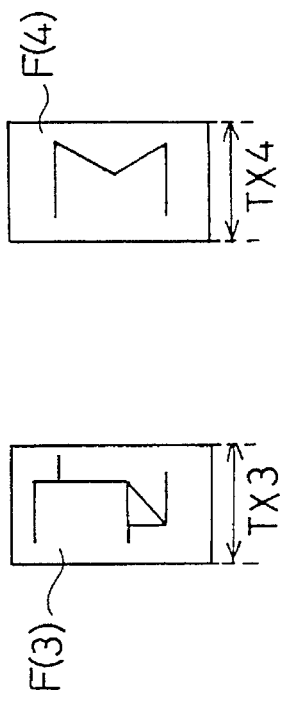
FIGS. 9B–9E show dot data of format patterns.
Figure 10:
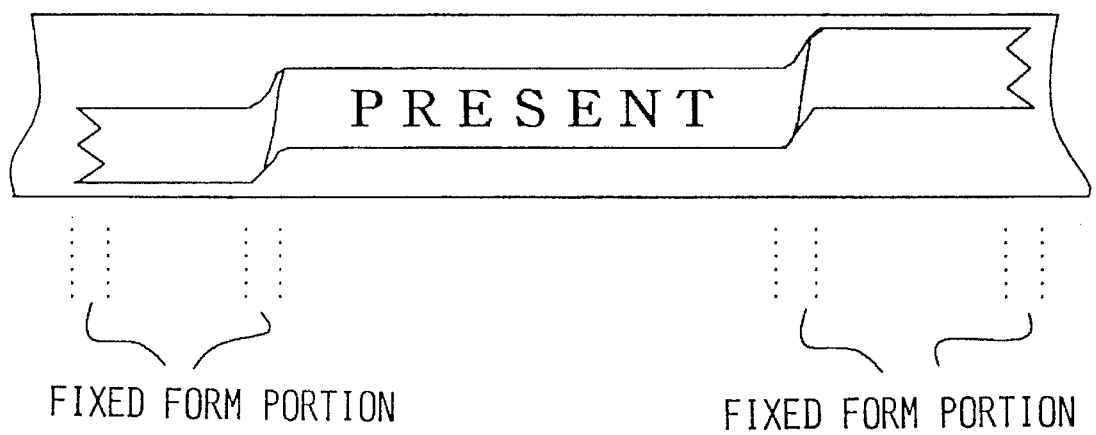
FIG. 10 shows a print result of a format print.

Subsequently, through a NO determination at S52, a character code is read in from the text read pointer TRP, and through a NO judgment at S54 and S55, the program goes to S62. Here, since the format data preparation stage memory FORMAT=1, through a NO judgment at S62 and a YES judgment at S63, the location of the characters is determined through processing at S71, S66 and S58, and then the program returns to S52. Subsequently, likewise, processing is conducted in accordance with the variable F, representing the type of the format when the format code is read in, and with the value of the format data preparation stage memory FORMAT, when character code is read in. When, in response to the end of processing of all the characters, a judgment at S52 becomes YES, the program goes to S59. At this time, the format data preparation stage memory FORMAT=3, so that the determination at S59 becomes YES, and through the processing of the last fixed form portion at S60, the program goes to S61 to perform a printing operation. Through this operation, as shown in FIG. 9A, characters surrounded by a predetermined border line are printed.

As described above, the data for various kinds of formatted border printing in accordance with format numbers are stored beforehand in the ROM 32, so that merely by indicating a format number, various kinds of border format print data in accordance with the format number can be obtained, and various kinds of borders can be printed on the basis of the data. Therefore, print variations can be increased.

This invention is not limited to the specific embodiment described above; various modifications may be made without departing from the subject matter of this invention. For example, in the described embodiment, a border line divided into three blocks is shown. However, it may be divided into any number of blocks. Further, in this embodiment, the character input is carried out by the keyboard; however, it may be carried out by a character selection dial. Still further, in this embodiment, description is made of a tape print device for the Japanese language; however, this invention may be applied to various kinds of print devices for various languages.

As described above, according to this invention, border data representing a border line divided into at least two blocks is stored beforehand, and document data is located within the border line represented by the border data. Therefore, a border having a complicated shape can be printed, and print variations can be increased.

What is claimed is:

1. A print device, comprising:

input means for inputting characters and instructions;

input data storing means for storing document data corresponding to the characters input by said input means;

display means for displaying a document represented by the document data stored in said input data storing means;

border storage means for storing border data including at least two blocks of border line;

designating means for designating at least one block of border line of the border data for association with the document data;

locating means for locating the at least one block of border line with respect to a character of the input characters;

border data expanding means for expanding the border data in accordance with the characters input to create the document data;

and printing means for printing the document represented by the document data with the designated at least one block of border line.

2. A print device as claimed in claim 1, wherein said printing means comprises a thermal head having a plurality of heating elements, said printing means printing plural dot arrays corresponding to the document data on a print tape of transparent film.

3. A print device as claimed in claim 2, wherein said input means is a keyboard and said display means is an L.C.D.

4. A print device as claimed in claim 1, further comprising:

a print buffer coupled to the printing means;

a reference position memory for storing reference position coordinates corresponding to a location of dot pattern data in the print buffer;

a size memory for storing character dot numbers representing character size; and an inter-character memory for storing dot numbers representing spacing between characters.

5. A print device as claimed in claim 1, wherein the input data storing means stores format codes corresponding to different blocks of border line.

6. A printer as claimed in claim 1, wherein said locating means adjusts the document data in a Y-direction to correspond to the height of a block of border line designated by the designating means.

7. A printer, comprising:
   a border memory for storing a plurality of blocks of border line;
   a format selector for selecting at least one block of border line from the plurality of blocks of border line in said border memory;
   an input unit for inputting at least one character into a text memory;
   a buffer for storing data to be printed;
   a locating controller for locating the at least one block of border line selected by said format selector relative to the at least one character input by said input unit in the buffer; and
   a printing controller for printing the selected at least one block of border line relative to the at least one input character in the buffer.

8. A printer as claimed in claim 7, wherein said text memory stores a format code designated by said format selector representing a block of border line associated with a character input by the input unit.

9. A printer as claimed in claim 7, further comprising a transforming controller for expanding a selected block of border line in accordance with the number of characters input by the input unit, by transforming border line data corresponding to said selected block of border line.

10. A printer as claimed in claim 7, wherein said locating controller comprises a reference position coordinate memory, a pattern size memory for storing a size of a block of border line, a character size memory for storing a size of a character and an inter-character memory for storing a distance between characters, wherein said locating controller increments a reference position coordinate by a border size when said format selector selects one of said plurality of blocks of border line, and said locating controller increments a reference position coordinate by a character size and an inter-character distance in response to a format code and a character input by the input unit.

11. A printer as claimed in claim 7, wherein said locating controller adjusts a character in a Y-direction to correspond to the height of a selected block of border line.

12. A print device as claimed in claim 7, wherein said printing controller further comprises a thermal head having a plurality of heating elements, said printing controller printing plural dot arrays on a print tape of transparent film.

13. A printing method for a printer having an input unit for inputting characters and instructions and a border memory for storing a plurality of blocks of border line, the method comprising the steps of:
   selecting at least one block of border line from the plurality of blocks of border line in said border memory;
   inputting at least one character into a text memory by said input unit;
   instructing where each selected block of border line should be located with respect to a character input into the text memory;
   disposing each selected block of border line and the respective input character in a buffer; and
   printing each selected border line as disposed with the respective input character in the buffer.

14. A printing method as claimed in claim 13, further comprising the step of storing a format code representing each selected block of border line into the text memory, wherein each character input by the input unit and the format code representing each block of border line are stored in the text memory in the order of input of the each character and each format code.

15. A printing method as claimed in claim 13, wherein said disposing step comprises the step of adding a border size to a reference coordinate when a block of border line is selected, and further comprises the step of adding a character size and an inter-character distance to the reference coordinate when said input unit inputs a character, to dispose the selected block of border line accurately with respect to the character.

16. A printing method as claimed in claim 15, wherein said disposing step comprises the step of adjusting a character in a Y-direction to correspond to the height of the selected block of border line.

17. A printing method as claimed in claim 13, further comprising the step of expanding a selected block of border line, in accordance with the number of characters input by the input unit, by transforming the border line data corresponding to said selected block of border line.

* * * * *